Patented Feb. 27, 1940

2,191,974

UNITED STATES PATENT OFFICE 2,191,974

DIETHERS OF DIMETHYLOL UREA AND PROCESS FOR MAKING SAME

Ben E. Sorenson, Upper Darby, Pa., assignor to E. I. du Pont de Nemours & Company, Wilmington, Del., a corporation of Delaware No Drawing. Application December 17, 1937, Serial No. 180,454

7 Claims. (Cl. 260—553)

This invention relates to urea derivatives, and more particularly to alkyl diethers of dimethylol urea.

The normal alkyl ethers of dimethylol urea have been mentioned in the literature and a method for their preparation described. The procedure described consists in dissolving dimethylol urea in a normal alkyl alcohol as n-propyl or n-butyl alcohol containing a small amount of hydrochloric acid. The solution is allowed to stand for 10 to 20 minutes after which it is neutralized with silver carbonate and filtered. The filtrate may then be concentrated if necessary and cooled whereupon crystals separate. These materials have been identified as the normal alkyl diethers of dimethylol urea. However, when an attempt was made to prepare the iso-alkyl and secondary alkyl diethers of dimethylol urea according to the above procedure the results were unsuccessful in that no diethers were obtained. A large part of the dimethylol urea remained undissolved in the acidified alcohol even after a period of 5 hours and upon neutralizing and filtering no diether separated on cooling or chilling. On evaporating the alcohol at room temperature a few isolated crystals appeared which however could not be recovered since they were so highly contaminated with a resinous product. This procedure was therefore found not to be adaptable to the preparation of iso or secondary dialkyl ethers of dimethylol urea. It is, however, desirable to obtain the iso and secondary diethers for economic reasons since they possess properties of value for commercial use.

This invention has as an object a new process applicable generally for the production of diethers of dimethylol urea. A further object is a process for making iso and secondary diethers of the reaction product of urea and formaldehyde. A still further object resides in new compounds consisting of such iso and secondary diethers. Other objects will appear hereinafter.

I have now found that dialkyl ethers of dimethylol urea can be readily prepared by reacting substantially dry dimethylol urea with the alcohol by heating in the presence of anhydrous magnesium sulphate for a time sufficient for complete reaction. The solution thus obtained is filtered to remove the magnesium sulphate containing most of the water of reaction as the hydrate and the crude diether product isolated by concentrating the solution by evaporation. The crude diether is purified by recrystallizing from suitable solvents.

The following examples are illustrative of the methods used in practising my invention:

EXAMPLE I

Dimethylol urea di-isobutyl ether

Six hundred grams (5 mols) of dimethylol urea and 3000 grams (40.5 mols) of isobutyl alcohol were placed in a 5 liter flask fitted with a rapid stirrer and a reflux condenser and 300 grams of anhydrous magnesium sulphate added to the mixture. The flask was heated and the contents raised to a temperature of 80–90° C. and kept at this temperature for a period of two hours. The contents of the flask were then filtered to remove the magnesium sulphate. The filtrate was then concentrated in shallow pans during which process the crystalline diether was deposited. When the crystalline material in the pans was practically dry it was dissolved in sufficient ethyl ether to make a concentrated solution and the solution filtered to remove any insoluble material that might be present. The filtrate was then chilled at a temperature of from 0° C. to −20° C. under which condition the diether was precipitated. The precipitated material was then filtered and any adhering diethyl ether removed by simple air drying. The yield obtained was 732 grams which is 63% of the theoretical yield based on the dimethylol urea used. This product had a melting point of 79–82° C. On recrystallizing the product from diethyl ether several times a product was obtained having a melting point of 81–82° C. (uncorrected). Nitrogen calculated for the product as $C_{11}H_{24}N_2O_3$ is 12.07%. On analysis 11.97% and 12.06% nitrogen was found.

EXAMPLE II

Dimethylol urea di-isopropyl ether

Three hundred grams (2.5 mols) of dimethylol urea and 1500 grams (25.0 mols) of isopropyl alcohol were mixed in a 3 liter flask fitted with a rapid stirrer and a reflux condenser. To the mixture was added 150 grams of anhydrous magnesium sulfate and the entire mass was heated with stirring for 2 hours at 70° C. and then refluxed without stirring for an additional one hour. The material was allowed to stand overnight and then filtered to remove the hydrated magnesium sulphate. The filtrate was made alkaline to phenolphthalein with alcoholic sodium hydroxide and evaporated in shallow pans at room temperature. As the solution became concentrated by the evaporation of the alcohol fine needle-like crystals were formed. The partially dry crystals were dissolved in hot water, filtered and recrystallized from the concentrated solution. Material recrystallized twice from hot water yielded a melting point of 113-113.5° C. (uncorrected). The theoretical nitrogen content for the formula C₉H₂₀N₂O₃ is 13.72%. Found by analysis 12.8%.

EXAMPLE III

Dimethylol urea di-secondary-butyl ether

Two hundred grams of dimethylol urea (1.66 mols) were vigorously stirred in 1000 grams (13.5 mols) of secondary butyl alcohol in a 3 liter flask. To the material in the flask were added 100 grams of anhydrous magnesium sulphate and then heated to approximately 80° C. and kept at this temperature for 15 minutes. The material was then filtered to remove the hydrated magnesium sulphate and any other insoluble material present. The alcohol was then evaporated by allowing the material to stand in shallow pans and the crystalline product separated from the remaining liquid.

The crystalline material was separated and recrystallized from a mixture of methyl alcohol and ethyl ether. The thus recrystallized material yielded a melting point of 117-120° C. Further purification by recrystallization would have yielded material of a more definite melting point.

EXAMPLE IV

The dimethylol di-isobutyl ether was prepared as described in Example I up to the point of removing the alcohol. In place of evaporating the alcohol by placing the material in shallow pans the filtered liquid was placed in a distilling flask and the alcohol partially removed by distilling under reduced pressure with, for example, a maximum pressure of 30 mm. The concentrated solution in the distilling flask was then chilled with the subsequent separation of the crude diether. The yield where this procedure is carried out is lower than where the procedure of Example I is carried out but it allows of the recovery of a portion of the alcohol. A combination of the two procedures permits of a satisfactory yield of the diether together with the recovery of a large portion of the alcohol.

The dimethylol urea used in the foregoing examples may be prepared according to well known methods by reacting urea and formaldehyde in an alkaline medium at normal or slightly reduced temperature, removing the liquid from the precipitated material and drying in a suitable manner. A convenient and satisfactory procedure for preparing dimethylol urea is described in application Serial Number 34,300 filed August 1, 1935.

Although the best results are obtained when the procedure closely approximates that of the examples, some latitude in temperatures and proportions is permissible. For economy the alcohol and dimethylol urea should be present in substantially at least twice chemically equivalent proportions or a minimum of 4 mols of alcohol to 1 mol of dimethylol urea. The amount of magnesium sulphate used is preferably about one-half the weight but may be as high as two times the weight of dimethylol urea used. Larger quantities may be used but are not necessary. The temperatures are preferably from 60° C. to 100° C. but may be as low as 50° C. and as high as 125° C.

As has been previously pointed out, my new process makes possible the production of iso and secondary alkyl ethers the preparation of which has not previously been possible. These new types of compounds not hitherto available which are obtained by the practice of this invention are very valuable commercially. These new ethers are of the formula:

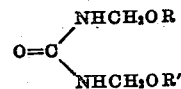

in which R and R' are hydrocarbon radicals at least one of which is an iso or secondary radical.

The new process described herein is readily adaptable to the preparation of the dimethyl and diethyl ethers of dimethylol urea as well as to the preparation of the normal diethers as propyl, butyl, etc. Such diethers have been prepared in a high state of purity by the present method and with very satisfactory yields. Further, aromatic diethers may be prepared according to the present procedure by using aryl alcohols which are to be understood as included in the term alcohol as used herein. Thus the dibenzyl ether of dimethylol urea may be prepared with benzyl alcohol. It is also possible to make mixed alkyl-aryl ethers by using a mixture of alcohols containing an aryl and alkyl alcohol.

The new procedure is also particularly adaptable to the preparation of the normal alkyl diethers of dimethylol urea with resulting higher yields by the use of dry dimethylol urea than are obtained by the previously referred to method. Further the present method possesses the advantage over the so-called acid method in that neutralization is unnecessary since the reaction takes place in essentially neutral medium which allows the product to be obtained in crystalline form and eliminates or reduces to a minimum the tendency to resinification. Other and important advantages will be readily apparent to those skilled in the art of preparing materials such as are herein described.

The ethers of dimethylol urea described herein yield upon heat treatment resinous products which are useful in the preparation of coating compositions.

As many apparently widely different embodiments of this invention may be made without departing from the spirit and scope thereof, it is to be understood that I do not limit myself to the specific embodiments thereof except as defined in the appended claims.

I claim:

1. A process which comprises reacting in the presence of anhydrous magnesium sulfate dimethylol urea and a saturated monohydric alcohol in which the alcoholic hydroxyl group is attached through acyclic carbon to a hydrocarbon radical, said alcohol being selected from the class consisting of aryl alcohols and normal, secondary and iso aliphatic alcohols, and continuing the reaction until the diether of dimethylol urea is formed.

2. A process which comprises heating in the presence of anhydrous magnesium sulfate at a temperature of from 60° C. to 100° C. dimethylol urea and a saturated monohydric alcohol in which the alcoholic hydroxyl group is attached through acyclic carbon to a hydrocarbon radical, said alcohol being selected from the class consisting of aryl alcohols and normal, secondary and iso aliphatic alcohols, and continuing the heating until the diether of dimethylol urea is formed.

3. The process set forth in claim 1 in which said alcohol is an iso-alcohol.

4. The process set forth in claim 1 in which said alcohol is a secondary alcohol.

5. An ether of the formula

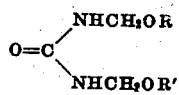

in which R and R' are hydrocarbon radicals of the class consisting of iso and secondary radicals, said last mentioned radical being joined to the oxygen atom by an acyclic carbon atom.

6. The ether set forth in claim 5 in which said radicals R and R' are iso alcohol radicals.

7. The ether set forth in claim 5 in which said radicals R and R' are secondary alcohol radicals.

BEN E. SORENSON.